(12) United States Patent
Levy

(10) Patent No.: US 8,127,137 B2
(45) Date of Patent: Feb. 28, 2012

(54) WATERMARK PAYLOAD ENCRYPTION FOR MEDIA INCLUDING MULTIPLE WATERMARKS

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 1301 days.

(21) Appl. No.: 11/082,217

(22) Filed: Mar. 15, 2005

(65) Prior Publication Data

US 2005/0262351 A1    Nov. 24, 2005

Related U.S. Application Data

(60) Provisional application No. 60/554,543, filed on Mar. 18, 2004.

(51) Int. Cl.
*H04L 9/32* (2006.01)

(52) U.S. Cl. ......... 713/176; 358/3.28; 348/509; 380/54; 380/55; 705/75

(58) Field of Classification Search .................. 713/176; 380/54, 55; 358/3.28; 705/75; 283/113; 348/589
See application file for complete search history.

(56) References Cited

U.S. PATENT DOCUMENTS

| | | |
|---|---|---|
| 4,179,686 A | 12/1979 | Bonicalzi et al. |
| 4,302,810 A | 11/1981 | Bouricius et al. |
| 4,782,342 A | 11/1988 | Walton |
| 4,879,747 A | 11/1989 | Leighton |
| 4,994,831 A | 2/1991 | Marandi |
| 5,113,445 A | 5/1992 | Wang |
| 5,284,364 A | 2/1994 | Jain |
| 5,321,751 A | 6/1994 | Ray et al. |
| 5,329,108 A | 7/1994 | Lamoure |
| 5,336,871 A | 8/1994 | Colgate, Jr. |
| 5,337,361 A | 8/1994 | Wang et al. |
| 5,450,492 A | 9/1995 | Hook |
| 5,471,533 A | 11/1995 | Wang et al. |
| 5,490,217 A | 2/1996 | Wang et al. |
| 5,505,494 A | 4/1996 | Belluci et al. |
| 5,613,004 A | 3/1997 | Cooperman et al. |
| 5,635,012 A | 6/1997 | Belluci et al. |

(Continued)

FOREIGN PATENT DOCUMENTS

DE    29 43 436    5/1981

(Continued)

OTHER PUBLICATIONS

U.S. Appl. No. 60/256,627, filed Dec. 18, 2000, Bradley et al.

(Continued)

*Primary Examiner* — April Shan

(57) ABSTRACT

The present invention provides encryption techniques useful with digital watermarking payloads. One claim recites: a method to secure a first digital watermark payload and a second digital watermark payload through encryption of only one of the first digital watermark payload or the second digital watermark payload. The method includes: utilizing a multi-purpose computer processor configured to: provide information redundantly in the first digital watermark payload and the second digital watermark payload, yet the first digital watermark payload includes at least some information that is unique relative to at least the second digital watermark payload; encrypt the first digital watermark payload; embed a first digital watermark in media, the media representing audio, imagery or video, the first digital watermark comprising the encrypted first digital watermark payload; and embed a second digital watermark in the media, the second digital watermark comprising the second digital watermark payload. Of course, additional claims and combinations are provided.

29 Claims, 6 Drawing Sheets

U.S. PATENT DOCUMENTS

| | | | |
|---|---|---|---|
| 5,652,626 A | 7/1997 | Kawakami et al. | |
| 5,721,788 A | 2/1998 | Powell et al. | |
| 5,748,763 A | 5/1998 | Rhoads | |
| 5,786,587 A | 7/1998 | Colgate, Jr. | |
| 5,787,186 A | 7/1998 | Schroeder | |
| 5,841,886 A | 11/1998 | Rhoads | |
| 5,862,260 A | 1/1999 | Rhoads | |
| 5,864,623 A | 1/1999 | Messina et al. | |
| 5,915,588 A | 6/1999 | Stoken et al. | |
| 5,949,885 A | 9/1999 | Leighton | |
| 5,956,513 A | 9/1999 | McLain, Jr. | |
| 5,984,366 A | 11/1999 | Priddy | |
| 5,995,626 A | 11/1999 | Nishioka et al. | |
| 6,081,907 A | 6/2000 | Witty et al. | |
| 6,122,403 A | 9/2000 | Rhoads | |
| 6,127,928 A | 10/2000 | Issacman et al. | |
| 6,137,884 A | 10/2000 | Micali | |
| 6,219,791 B1 | 4/2001 | Blanchard et al. | |
| 6,243,480 B1 | 6/2001 | Zhao et al. | |
| 6,264,106 B1 | 7/2001 | Bridgelall | |
| 6,285,775 B1 | 9/2001 | Wu et al. | |
| 6,286,761 B1 | 9/2001 | Wen | |
| 6,321,981 B1 | 11/2001 | Ray et al. | |
| 6,327,576 B1 | 12/2001 | Ogasawara | |
| 6,332,031 B1 | 12/2001 | Rhoads et al. | |
| 6,363,480 B1 | 3/2002 | Perlman | |
| 6,385,329 B1* | 5/2002 | Sharma et al. | 382/100 |
| 6,389,151 B1 | 5/2002 | Carr et al. | |
| 6,442,284 B1 | 8/2002 | Gustafson et al. | |
| 6,463,416 B1 | 10/2002 | Messina | |
| 6,519,352 B2 | 2/2003 | Rhoads | |
| 6,523,114 B1 | 2/2003 | Barton | |
| 6,532,562 B1 | 3/2003 | Chou et al. | |
| 6,536,665 B1 | 3/2003 | Ray et al. | |
| 6,557,103 B1 | 4/2003 | Boncelet et al. | |
| 6,560,349 B1 | 5/2003 | Rhoads | |
| 6,577,759 B1 | 5/2003 | Zolotarev et al. | |
| 6,574,350 B1 | 6/2003 | Rhoads et al. | |
| 6,577,746 B1 | 6/2003 | Evans et al. | |
| 6,608,911 B2 | 8/2003 | Lofgren et al. | |
| 6,609,659 B2 | 8/2003 | Sehr | |
| 6,611,607 B1 | 8/2003 | Davis et al. | |
| 6,614,914 B1 | 9/2003 | Rhoads et al. | |
| 6,636,615 B1 | 10/2003 | Rhoads et al. | |
| 6,674,886 B2 | 1/2004 | Davis et al. | |
| 6,678,389 B1 | 1/2004 | Sun et al. | |
| 6,708,049 B1 | 3/2004 | Berson et al. | |
| 6,728,390 B2 | 4/2004 | Rhoads et al. | |
| 6,732,924 B2 | 5/2004 | Ishigame | |
| 6,744,906 B2 | 6/2004 | Rhoads et al. | |
| 6,751,336 B2 | 6/2004 | Zhao | |
| 6,761,316 B2 | 7/2004 | Bridgelall | |
| 6,768,808 B2 | 7/2004 | Rhoads | |
| 6,786,420 B1 | 9/2004 | Silverbrook | |
| 6,791,955 B1 | 9/2004 | Kikuchi et al. | |
| 6,807,285 B1 | 10/2004 | Iwamura | |
| 6,826,546 B1 | 11/2004 | Shuster | |
| 6,836,791 B1 | 12/2004 | Levi et al. | |
| 6,843,422 B2 | 1/2005 | Jones et al. | |
| 6,850,626 B2 | 2/2005 | Rhoads et al. | |
| 6,850,910 B1 | 2/2005 | Yu et al. | |
| 6,869,023 B2 | 3/2005 | Hawes | |
| 6,882,737 B2 | 4/2005 | Lofgren et al. | |
| 6,883,716 B1 | 4/2005 | DeJong | |
| 6,910,136 B1 | 6/2005 | Wesserman et al. | |
| 6,910,628 B1 | 6/2005 | Sehr | |
| 6,913,199 B2 | 7/2005 | He | |
| 6,923,378 B2 | 8/2005 | Jones et al. | |
| 6,944,650 B1 | 9/2005 | Urien | |
| 6,958,346 B2 | 11/2005 | Hekmatpour | |
| 6,970,573 B2 | 11/2005 | Carr et al. | |
| 6,973,197 B2 | 12/2005 | Miller | |
| 6,975,744 B2 | 12/2005 | Sharma et al. | |
| 6,975,746 B2 | 12/2005 | Davis et al. | |
| 6,991,174 B2 | 1/2006 | Zuili | |
| 7,007,852 B2 | 3/2006 | Silverbrook et al. | |
| 7,016,516 B2 | 3/2006 | Rhoads | |
| 7,020,304 B2 | 3/2006 | Alattar et al. | |
| 7,027,614 B2 | 4/2006 | Reed | |
| 7,039,214 B2 | 5/2006 | Miller et al. | |
| 7,054,462 B2 | 5/2006 | Rhoads et al. | |
| 7,058,199 B1 | 6/2006 | Au | |
| 7,133,534 B2* | 11/2006 | Epstein et al. | 382/100 |
| 7,154,622 B2 | 12/2006 | Constantin | |
| 7,165,175 B1 | 1/2007 | Kollmyer et al. | |
| 7,171,016 B1 | 1/2007 | Rhoads | |
| 7,194,106 B2 | 3/2007 | Brundage et al. | |
| 7,213,757 B2 | 5/2007 | Jones et al. | |
| 7,222,235 B1 | 5/2007 | Mitsui | |
| 7,254,249 B2 | 8/2007 | Rhoads et al. | |
| 7,266,217 B2 | 9/2007 | Rhoads et al. | |
| 7,269,275 B2 | 9/2007 | Carr et al. | |
| 7,305,104 B2 | 12/2007 | Carr et al. | |
| 7,319,775 B2 | 1/2008 | Sharma et al. | |
| 7,333,615 B1 | 2/2008 | Jarboe et al. | |
| 7,349,555 B2 | 3/2008 | Rhoads | |
| 7,386,627 B1 | 6/2008 | Lango et al. | |
| 7,409,545 B2 | 8/2008 | Perlman | |
| 7,412,072 B2 | 8/2008 | Sharma et al. | |
| 7,427,030 B2 | 9/2008 | Jones et al. | |
| 7,486,799 B2 | 2/2009 | Rhoads | |
| 7,519,819 B2 | 4/2009 | Bradley et al. | |
| 7,657,058 B2 | 2/2010 | Sharma | |
| 7,748,442 B2 | 8/2010 | Sharma et al. | |
| 2001/0037313 A1 | 11/2001 | Lofgren et al. | |
| 2002/0009208 A1* | 1/2002 | Alattar et al. | 382/100 |
| 2002/0011519 A1 | 1/2002 | Shults, III | |
| 2002/0019767 A1 | 2/2002 | Babbitt et al. | |
| 2002/0040433 A1 | 4/2002 | Kondo | |
| 2002/0044662 A1 | 4/2002 | Sowler | |
| 2002/0048369 A1* | 4/2002 | Ginter et al. | 380/277 |
| 2002/0076080 A1 | 6/2002 | Hecht et al. | |
| 2002/0159614 A1 | 10/2002 | Bradley et al. | |
| 2002/0170966 A1 | 11/2002 | Hannigan et al. | |
| 2003/0033530 A1 | 2/2003 | Sharma et al. | |
| 2003/0037075 A1 | 2/2003 | Hannigan et al. | |
| 2003/0039360 A1 | 2/2003 | Younis | |
| 2003/0041242 A1 | 2/2003 | Patel | |
| 2003/0056102 A1 | 3/2003 | Aho et al. | |
| 2003/0061561 A1 | 3/2003 | Rifaat et al. | |
| 2003/0089764 A1 | 5/2003 | Meadow et al. | |
| 2003/0223584 A1 | 12/2003 | Bradley et al. | |
| 2004/0017913 A1 | 1/2004 | Hawkes et al. | |
| 2004/0026496 A1 | 2/2004 | Zuili | |
| 2004/0039706 A1 | 2/2004 | Skowron et al. | |
| 2004/0039914 A1 | 2/2004 | Barr et al. | |
| 2004/0158724 A1* | 8/2004 | Carr et al. | 713/186 |
| 2004/0181671 A1 | 9/2004 | Brundage et al. | |
| 2004/0205330 A1 | 10/2004 | Godfrey et al. | |
| 2004/0223626 A1 | 11/2004 | Honsinger et al. | |
| 2005/0053258 A1* | 3/2005 | Pasqua | 382/100 |
| 2005/0063027 A1 | 3/2005 | Durst et al. | |
| 2005/0092849 A1 | 5/2005 | Silverbrook | |
| 2005/0094848 A1 | 5/2005 | Carr et al. | |
| 2005/0258248 A1 | 11/2005 | Silverbrook et al. | |
| 2005/0271246 A1 | 12/2005 | Sharma et al. | |
| 2006/0016107 A1 | 1/2006 | Davis | |
| 2006/0040726 A1 | 2/2006 | Szerek et al. | |
| 2007/0204163 A1 | 8/2007 | Andrews, III et al. | |
| 2008/0114698 A1 | 5/2008 | Shear et al. | |

FOREIGN PATENT DOCUMENTS

| | | |
|---|---|---|
| WO | WO 01/43080 | 6/2001 |
| WO | WO 01/61508 | 8/2001 |
| WO | WO 2004/102353 | 11/2004 |

OTHER PUBLICATIONS

U.S. Appl. No. 60/288,272, filed May 2, 2001, Sharma et al.
U.S. Appl. No. 60/544,543, filed Mar. 18, 2004, Levy.
U.S. Appl. No. 09/186,962, filed Nov. 9, 1998, Rhoads.
U.S. Appl. No. 10/193,719, filed Jul. 10, 2002, Sharma et al.
PCT/US2005/009072 (WO05-091547) Notice Concerning Transmittal of International Application as Published or Republished, dated Oct. 27, 2005, with Search Report.

Bradley et al., "Comparative Performance of Watermarking Schemes Using Mary Modulation with Binary Schemes Employing Error Correction Coding," Proc. SPIE, vol. 4314, pp. 629-642. 2001.

Bender et al., "Applications for Data Hiding," IBM Systems Journal, vol. 39, Nos. 3&4, 2000, pp. 547-568.

Chow et al. "Forgery and Tamper-Proof Identification Document," IEEE Proc. 1993 Int. Carnahan Conf. on Security Technology Oct. 13-15, 1993, pp. 11-14.

Gruhl et al., "Information Hiding to Foil the Casual Counterfeiter," Proc. 2.sup.nd Information Hiding Workshop, LNCS vol. 1525, Apr. 1998, pp. 1-15.

Fleet et al., "Embedding Invisible Information in Color Images," Proc. Int. Conf. On Image Processing, vol. 1, pp. 532-535, Oct. 1997.

Eric Kleefeld, "Passports to contain RFID chips next year: Government says its "more secure"; ACLU raises privacy concerns," Wisconsin Technology Network, published at http://wistechnology.com/article.php?id=2444 (published on Nov. 2, 2005; submitted sheets printed from the internet on Mar. 23, 2006), 3 pages.

Kawaguchi et al., "Principle and Applications of BPCS-Steganography," Proc. SPIE vol. 3528: Multimedia Systems and Applications, Nov. 2-4, 1998, pp. 464-473.

Koch et al., "Copyright Protection for Multimedia Data," Proc. Of the Int. Conf. on Digital Media and Electronic Publishing, Lees, U.K., 15 pages 1994.

Kutter, "Performance Improvement of Spread Spectrum Based Image Watermarking Schemes Through M-ary Modulation," Dresden Information Hiding Workshop, 1999, 16 pages.

Lin, C.-Y. et al., "Generating Robust Digital Signature for Image/Video Authentication," Proc. Multimedia and Security Workshop at ACM Multimedia'98, Sep. 1998, pp. 49-54.

Matsui et al., "Embedding a Signature to Pictures Under Wavelet Transformation," Transactions of the Institute of Electronics Information and Communication Engineers D-II vol. J79D-II, No. 6, Jun. 1996, pp. 1017-1024. (English abstract provided).

Perry, et al., "Digital Watermarks as a Security Feature for Identity Documents," Proceedings of SPIE, vol. 3973, Apr. 2000, pp. 80-87.

Schneider, M., "A Robust Content Based Digital Signature for Image Authentication," IEEE Proc. Int. Conf. on Image Processing, Sep. 1996, pp. 227-230 (vol. 3).

Szepanski, "A Signal Theoretic Method for Creating Forgery-Proof Documents for Automatic Verification," Proceedings 1979 Carnahan Conference on Crime Countermeasures, May 16, 1979, pp. 101-109.

Szepanski, "Additive Binary Data Transmission for Video Signals," Conference of the Communications Engineering Society, 1980, NTG Technical Reports, vol. 74, pp. 343-351, (German text and English translation enclosed).

Xie, L. et al., "Secure MPEG Video Communications by Watermarking," Proc. Conf. of ATIRP (Advanced Telecommunications and Information Distribution Research Project), Feb. 1999, pp. 459-462.

Nov. 10, 2010 final Office Action; Aug. 24, 2010 Amendment; Mar. 24, 2010 non-final Office Action; Dec. 17, 2009 Amendment; Jul. 23, 2009 non-final Office Action; Apr. 24, 2009 Amendment; Nov. 25, 2008 non-final Office Action; Oct. 22, 2008 Amendment; Oct. 15, 2008 Restriction Requirement; all from assignee's U.S. Appl. No. 11/082,179 (published as US 2005-0271246 A1).

U.S. Appl. No. 60/554,541, filed Mar. 18, 2004.

U.S. Appl. No. 60/558,767, filed Mar. 31, 2004.

* cited by examiner

WATERMARK PAYLOAD ENCRYPTION FOR MEDIA INCLUDING MULTIPLE WATERMARKS

RELATED APPLICATION DATA

This application claims the benefit of U.S. Provisional Patent Application No. 60/554,543, filed Mar. 18, 2004.

This patent application is related to the following U.S. patent application Ser. No. 10/020,519 (published as US 2002-0159614 A1), filed Dec. 14, 2001, which claims the benefit of 60/256,627, filed Dec. 18, 2000; Ser. No. 10/193,719 (published as US 2003-0033530 A1), filed Jul. 10, 2002; Ser. No. 10/139,147 (published as US 2003-0037075 A1), filed May 2, 2002, which claims the benefit of 60/288,272, filed May 2, 2001; Ser. No. 09/186,962, filed Nov. 5, 1998, which is a continuation of application Ser. No. 08/649,419, filed May 16, 1996 (now U.S. Pat. No. 5,862,260); and Ser. No. 09/790,322 (published as US 2001-0037313 A1), filed Feb. 21, 2001.

Each of the above patent documents is hereby incorporated by reference.

TECHNICAL FIELD

The invention relates to digital watermarking, steganography, and specifically to message coding protocols used in conjunction with digital watermarking and steganographic encoding/decoding methods.

BACKGROUND AND SUMMARY

Digital watermarking is a process for modifying physical or electronic media signals to embed a hidden machine-readable code into the media. The media signal may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects. Steganography is related field of study pertaining to encoding and decoding of hidden auxiliary data signals, such that the auxiliary data is not discernable by a human.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking and steganographic techniques have been developed. The reader is presumed to be familiar with the literature in this field. Particular techniques for embedding and detecting auxiliary messages in media signals are detailed in the assignee's U.S. Pat. Nos. 6,122,403 and 6,614,914, which are hereby incorporated by reference.

One practical challenge in the deployment of digital watermarking systems is the potential lack of flexibility in changing aspects of the digital watermark system once it's deployed. As system and application requirements change, there is sometimes a desire to change aspects of the digital watermark message coding protocol. For example, one might want to change the format, syntax, semantics and length of the message payload in the digital watermark. The syntax used in the protocol can include the types and sizes of message fields, as well as the symbol coding alphabet (e.g., use of binary or M-ary symbols, etc.) The semantics used in the protocol refer to the meaning of the message elements in the message payload (e.g., what the elements are interpreted to mean). While such changes may not alter the fundamental data hiding or extraction function, they present a practical difficulty because the deployed digital watermark readers may be rendered obsolete if the protocol is changed.

One potential solution is to upgrade the readers deployed in the field. However, this presents technical challenges, such as whether the readers are accessible and/or re-programmable to receive and facilitate upgrades.

The invention provides variable message protocol methods for digital watermarking. One aspect of the invention is a message protocol method for digital watermarking. This method forms a fixed message protocol portion having a fixed length and identifying a version of a variable protocol portion. The method also forms a variable message protocol portion having variable error robustness message coding format. The version indicates the error robustness coding format of the variable protocol portion. The fixed and variable message protocol portions are then embedded into a host media signal such that the message is substantially imperceptible in the host media signal.

Another aspect of the invention is a method for decoding a digital watermark having fixed and variable protocol message portions. The method extracts a hidden message code embedded in a host media signal by evaluating the host media signal to compute the hidden message code having fixed and variable message protocol portions. It performs error robustness decoding of the fixed protocol portion of the extracted message code to produce one or more message symbols representing a version identifier. Next, it interprets the version identifier to ascertain a version of variable protocol used to embed the variable protocol portion. Finally, it applies an error robustness decoding method of the version to decode message symbols of the variable message protocol portion.

Another aspect of the invention is a message protocol method for steganographically encoding a variable message into a media signal. This method forms a control message portion including at least one symbol that identifies the format of the variable message. It also forms a variable message according to the format. The format indicates a variable length of the variable message portion. The method produces a media signal with the variable message steganographically encoded in it such that the variable message is not discernable by a human but is readable by an automated reader. For example where the media signal is an image, a human viewer is not able to read the variable message encoded in that image because symbols in the variable message are arranged so as not to be interpretable without knowledge of the encoding format.

Further features and aspects will become even more apparent with reference to the following detailed description and accompanying drawings.

DETAILED DESCRIPTION

Figure 1:
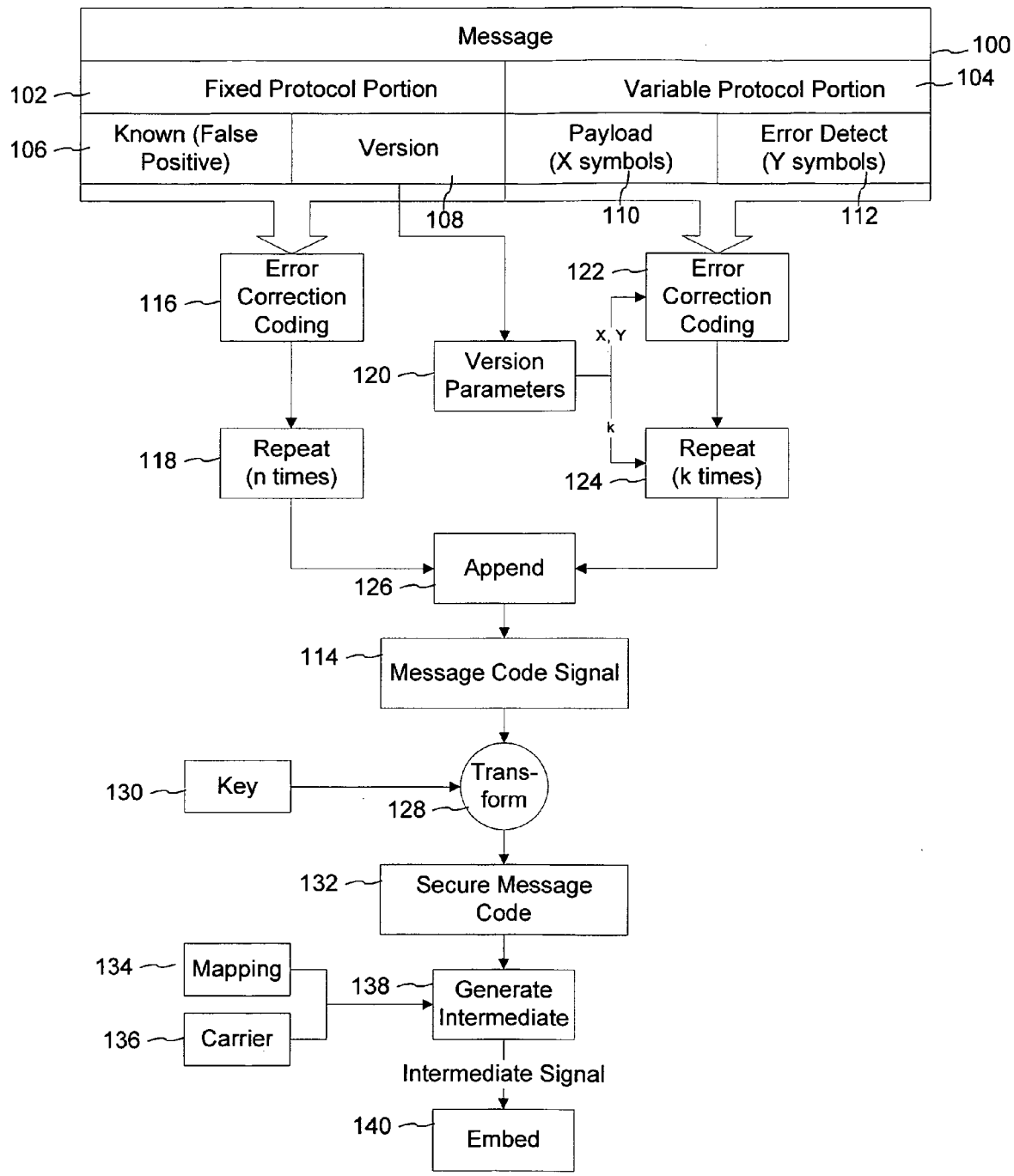
FIG. 1 is a diagram illustrating an extensible message protocol method for digital watermark embedding.

FIG. 1 is a diagram illustrating a message protocol method for digital watermark embedding. The protocol in this context refers to how the message is prepared for digital watermark embedding into a host media signal. One attribute specified by the message protocol is the error robustness coding that is applied to the message. Error robustness coding includes operations on the message that make it more robust to errors that undermine its complete and accurate recovery in potentially distorted version of the watermarked host media signal. Specific forms of error robustness coding include repetition of one or more parts of the message, and error correction coding of one or more parts of the message.

Another aspect of the message protocol is the length of the message payload. The message payload is a variable part of the message. It can be variable in both content (e.g., the values of the individual message symbols in the payload are variable), and length (e.g., the number of symbols is variable). This message payload enables the digital watermark system to convey unique information per watermarked item, such as an item ID, a transaction ID, a variable ASCII character message, etc.

A related aspect of the message protocol is the syntax and semantic meaning of the message elements. As the length of the payload is increased or decreased, the fields within that payload may change, as well as the semantic meaning of the fields. For example, the first N binary symbols may represent a unique ID, while the next M bits represent a source ID or hash of the object in which the information is embedded. As N and M change and other fields are added or deleted, the syntax and semantic meaning of symbols in the payload change.

Yet another aspect of the protocol is the extent to which it facilitates digital watermarking systems that have different message protocols, yet are backward and/or forward compatible with each other. Backward compatibility refers to the case where new versions of the digital watermark reader are able to read messages using the most recently released protocol version, as well as messages in every prior protocol version. Forward compatibility refers to the case where a current version of the digital watermark reader is able to read messages compatible with subsequently released protocol versions. Further examples illustrating this aspect of the protocol follow later.

The method illustrated in FIG. 1 operates with many different forms of digital watermark embedding and detecting operations. In other words, regardless of how the host media signal is modified to embed the result of the message protocol (referred to as the intermediate signal), the message protocol method is widely applicable.

The method of FIG. 1 also operates on different host media signal types and formats. For the sake of illustration, examples are presented of still image watermark embedding that are extendable to other media types, such as motion images (e.g., video) and audio. The method is implemented in software and operates on blocks of the host media signal of a fixed size. These blocks are typically much smaller than the overall size of the host signal, and as such, are tiled or otherwise repeated throughout the host signal to provide an additional layer of robustness beyond the robustness coding within each block.

Since the blocks are of fixed size in our example implementation, there are trade-offs between the length of the variable message payload and the extent of redundancy that may be employed to map that variable message payload into the host media signal of fixed size.

As shown in FIG. 1, the message 100 has a fixed protocol portion 102 and a variable protocol portion 104. The fixed protocol portion includes a fixed message part 106, and a variable message part 108. Each of the parts of the fixed protocol portion has a fixed length, and employs a fixed error robustness coding method. The fixed message part includes a fixed set of known message symbols that serve as a test for false positives (e.g., provide a check to ensure a valid digital watermark is present).

The variable part carries a version identifier 108. This version identifier may carry version parameters, such as an error correction type identifier, a repetition indicator, an error detect indicator or an index that refers to the type of error correction, error detection, and/or repetition applied in the variable protocol portion 104. The variable part of the fixed protocol varies so as to indicate the version of the variable protocol used in processing the variable protocol portion.

The variable protocol portion 104 includes a variable payload part 110 and an error detect part 112. As noted earlier, the payload has a variable number of symbols (X) as specified by the version. The protocol employs a form of error detection, such as a certain type and length of Cyclic Redundancy Check symbols. The variable message protocol portion, therefore, includes a number of error detect symbols (Y).

The message protocol method generates a message code signal 114 by performing error robustness coding on the fixed and variable protocol portions. In the case of the fixed protocol, the method uses a fixed error correction coding method 116 followed by fixed repetition 118 of the resulting message a predetermined number of times (n). While the diagram shows error correction followed by repetition coding, the error robustness coding of the fixed portion may include error correction and/or repetition coding. Examples of error correction coding include block codes (e.g., BCH, Reed Solomon, etc.), convolution codes, turbo codes or combinations thereof.

The version parameters 120 in the illustrated example specify the payload and error detection part lengths, and number of repetitions of the variable portion or individual parts of the variable portion. They may also specify the type of error correction coding to be applied, such as block codes, convolution codes, concatenated codes, etc. As explained further below, some forms of error correction, such as convolution codes, perform error correction in a manner that depends on subsequent symbols in the message symbol string. As such, symbols at the end of the string are error correction decoded with less confidence because there are fewer or no symbols following them. This attribute of error correction coding schemes that have "memory" can be mitigated by repeating parts of the message symbol string that are more susceptible to errors due to the lack of memory than other parts of the message symbol string. As noted, this typically leads to repetition of the tail of the string more than the beginning of the string.

According to the version parameters 120, the protocol method applies a selected error correction coding 122 to the symbols of the variable portion 104, and then applies repetition coding 124 to one or more parts of the error correction coded symbols.

The protocol method then appends 126 the robustness coded fixed and variable portions to form a message code signal 114.

For added security in some applications, the method transforms (128) the message code signal with a secret key. This transformation may include a vector XOR or matrix multiplication of a key 130, such as pseudorandom number that is sufficiently independent from other like key numbers, with the message code signal. The key may be a seed number to a pseudorandom sequence generator, an index to a look up table that produces a vector or matrix, or a vector/matrix, etc. The key serves the function of making the digital watermark unreadable to anyone except those having the proper key. The use of this key enables the digital watermarking protocol to be used for several entities wishing to privately embed and read their own digital watermarks, through the use of their own keys.

The result of the transformation by the key 130 is the secure message code 132. Our example implementation applies an additional transformation to the secure message code before embedding it into the host media signal block. In particular, a mapping function 134 maps elements of the secure message code vector to elements of the host signal block. The elements of the host signal block may be characteristics of individual samples (luminance of pixels or frequency coefficients), or characteristics of groups of samples (statistical features). The carrier signal function 136 transforms the message code elements as a function of corresponding elements of a carrier signal. One such example is spread spectrum modulation of the secure message code with a carrier signal. The carrier signal may have attributes that increase robustness of the watermark (message spreading and scattering as an anti-jamming mechanism), and facilitate detection and geometric synchronization (e.g., autocorrelation properties). The result of transformation by the carrier and mapping functions 138 is an intermediate signal. A digital watermark embedder 140 then modifies characteristics of elements of the host media signal block according to the elements of the intermediate signal to hide the intermediate signal in the host media signal block. There are a wide variety of such embedding methods that may be employed, including those discussed in the documents incorporated by reference. Where perceptual artifacts are a concern, human perceptual modeling may be employed to reduce the perceptibility of artifacts caused by modifying the host media signal block according to the intermediate signal.

Figure 2:
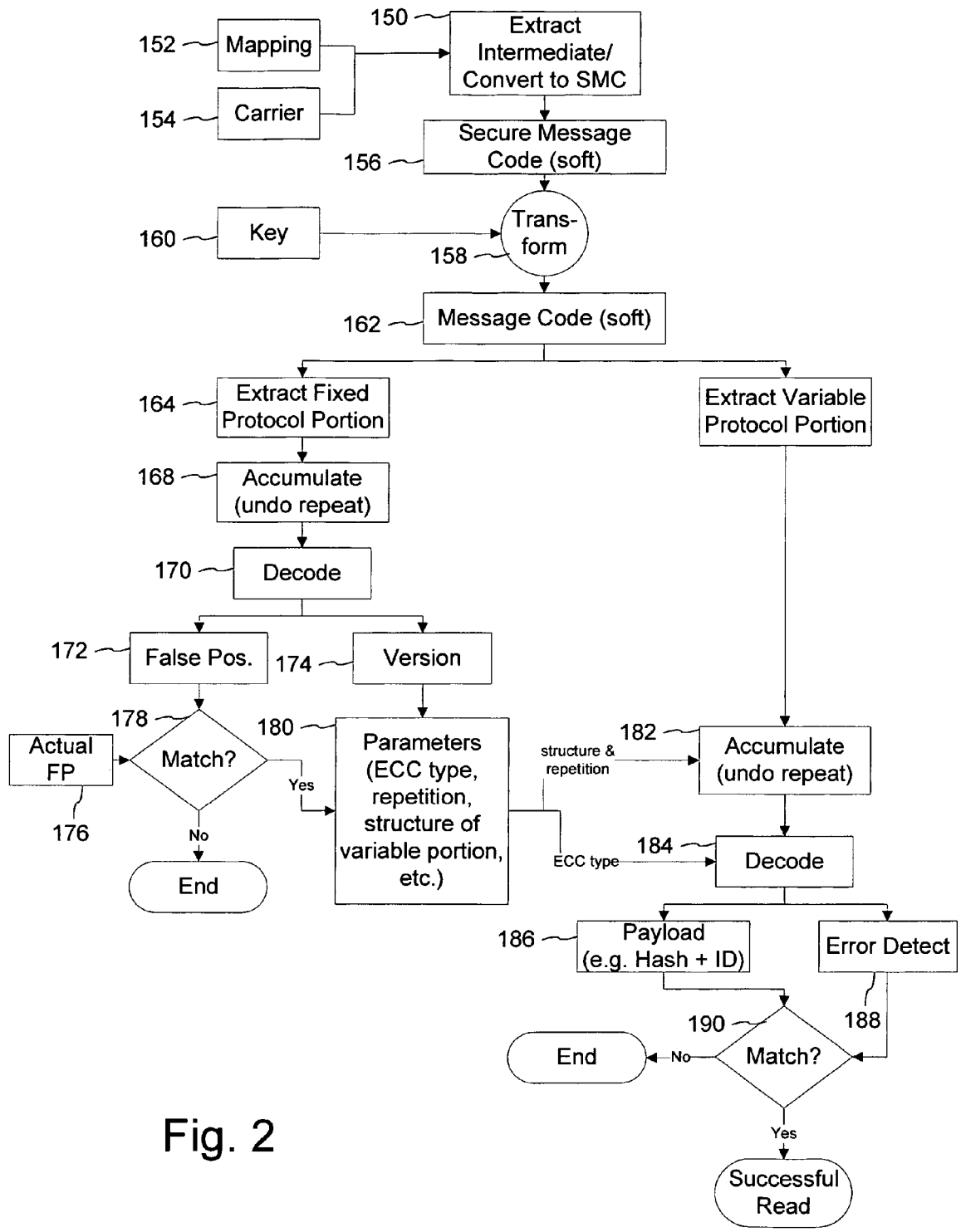
FIG. 2 is a diagram illustrating a method of extracting a digital watermark message from a host media signal that has been embedded using the method of FIG. 1.

FIG. 2 is a diagram illustrating a method of extracting a digital watermark message from a host media signal that has been embedded using the method of FIG. 1. This method is implemented in a software implementation of a digital watermark reader. The reader extracts estimates of values for the intermediate signal from the host, using a reader 150 compatible with the embedder 140 of FIG. 1. This process may be performed after filtering, synchronizing and generating blocks of the host media signal. In our implementation, the reader 150 extracts estimates of the intermediate signal elements. It then uses the mapping function 152 and carrier signal 154 to convert elements of the intermediate signal embedded in each host media signal block to soft estimates of the secure message code. These elements are soft estimates derived from aggregating elements from the intermediate signal estimate for each corresponding element of the secure message code 156 according to the mapping and carrier functions. In particular, each soft message code element represents a value between S, and −S, where S represents an integer corresponding to binary symbol 1, and −S represents the negative integer corresponding to binary symbol 0.

Next, the reader transforms (158) the secure message code estimate with the key 160. This operation reverses the key transformation 128 applied to the message code in the embedder of FIG. 1. The result is a message code signal estimate, which includes the fixed and variable message protocol portions. The reader extracts these portions (164, 166) and proceeds to apply the fixed protocol to decode the error robustness coding of the fixed protocol portion. This entails accumulation 168 of the repeated message symbols, followed by error correction decoding 170.

The result of the error correction decoding includes a set of fixed symbols (the false positive symbols) 172, and the version identifier 174. The reader compares the extracted fixed symbols with the actual fixed symbols 176, and if there is a match 178, then the version identifier is deemed to be accurate. The reader interprets the version identifier to get the version parameters 180, such as the error correction coding type for the variable protocol, the repetition parameters, the structure of the variable protocol portion, etc. The version parameters may be carried within the version identifier directly or may be accessed via a look-up operation, using the version identifier as an index.

With this version information, the reader proceeds to decode the error robustness coding of the variable protocol portion. This decoding entails, for example, accumulation 182 of the repeated symbols to undo the repetition coding, along with error correction decoding 184 according to the version information. The result of the decoding includes the payload 186 and error detection symbols 188. The reader applies the error detection method to the payload and compares 190 with the error detection symbols to confirm the accuracy of the payload information.

This protocol portion enables the watermarking system to be backward and forward compatible. It is backward compatible because each new version of watermark detector may be programmed to read digital watermarks embedding according to the current version and every prior version of the protocol. It can be forward compatible too by establishing version identifiers and corresponding protocols that will be used in future versions of the system. This enables watermark detectors deployed initially to read the current version of the protocol, as well as future versions of the protocol as identified in the version identifier. At the time of embedding a particular media signal, a digital watermark embedder embeds a version identifier of the protocol used to embed the variable protocol portion. At the time of reading the digital watermark, a reader extracts the version identifier to determine the protocol of the variable protocol portion, and then reads the message payload carried in the variable protocol portion.

Another embodiment of a digital watermarking protocol is described in U.S. Pat. No. 5,862,260, which is incorporated by reference. In this protocol, the digital watermark message includes a control message protocol portion and a variable message protocol portion. The control message includes control symbols indicating the format and length of the variable message protocol portion. The control message protocol and the variable message protocol include symbols that are mapped to locations within a block of the host signal called a "signature" block. As the length of the variable message portion increases, the redundancy of the control message portion decreases.

U.S. Pat. No. 5,862,260 describes a variety of digital watermark embedding methods. One such class of methods for images and video increments or decrements the values of individual pixels, or of groups of pixels (bumps), to reflect encoding of an auxiliary data signal combined with a pseudo random noise signal. One variation of this approach is to embed the auxiliary data—without pseudo randomization—by patterned groups of pixels, termed "bit cells."

Figure 3A:
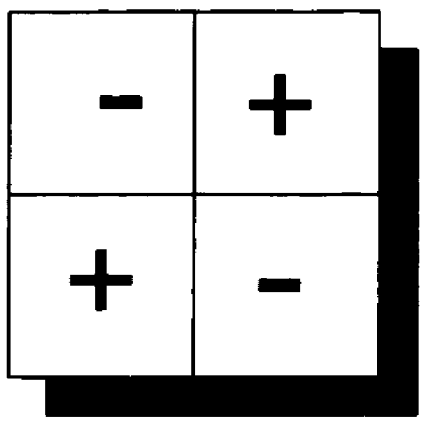
FIGS. 3A and 3B show examples of bit cells used in one form of digital watermark embedding.
Figure 3B:
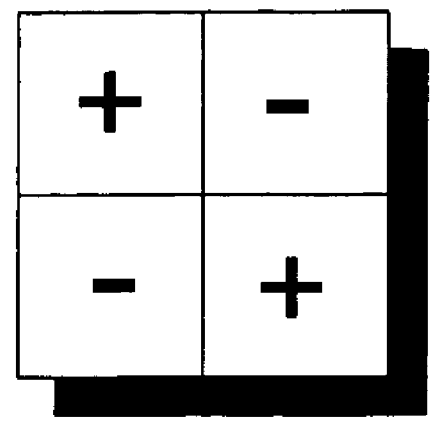

Referring to FIGS. 3A and 3B, two illustrative 2×2 bit cells are shown. FIG. 3A is used to represent a "0" bit of the auxiliary data, while FIG. 3B is used to represent a "1" bit. In operation, the pixels of the underlying image are tweaked up or down in accordance with the +/− values of the bit cells to represent one of these two bit values. The magnitude of the tweaking at any given pixel, bit cell or region of the image can be a function of many factors, including human perceptibility modeling, non-linear embedding operations, etc. as detailed in U.S. Pat. No. 5,862,260. In this case, it is the sign of the tweaking that defines the characteristic pattern. In decoding, the relative biases of the encoded pixels are examined using techniques described above to identify, for each corresponding region of the encoded image, which of the two patterns is represented.

While the auxiliary data is not explicitly randomized in this embodiment, it will be recognized that the bit cell patterns may be viewed as a "designed" carrier signal.

The substitution of a pseudo random noise carrier with a "designed" information carrier affords an advantage: the bit cell patterning manifests itself in Fourier space. Thus, the bit cell patterning can act like the subliminal digital graticules discussed in U.S. Pat. No. 5,862,260 to help register a suspect image to remove scale/rotation errors. By changing the size of the bit cell, and the pattern therein, the location of the energy thereby produced in the spatial transform domain can be tailored to optimize independence from typical imagery energy and facilitate detection.

While the foregoing discussion contemplates that the auxiliary data is encoded directly—without randomization by a PRN signal, in other embodiments, randomization can of course be used.

Figure 4:
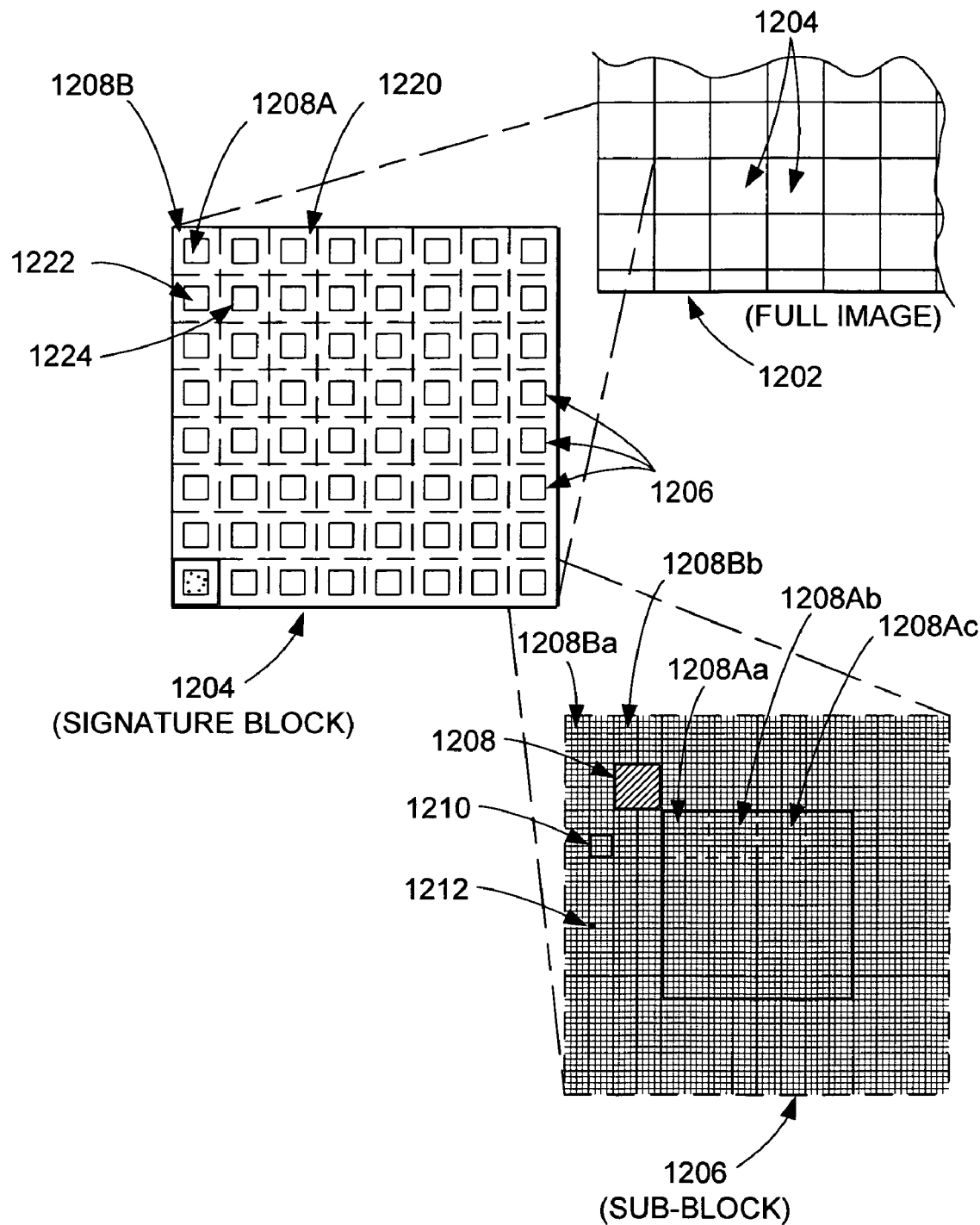
FIG. 4 shows a hierarchical arrangement of signature blocks, sub-blocks, and bit cells used in one implementation of a digital watermark message protocol.

FIG. 4 illustrates an example of a digital watermarking protocol having a message control portion and a variable portion. While this protocol is illustrated using an image, it applies to other media types and digital watermark embedding/reading systems.

Referring to FIG. 4, an image 1202 includes a plurality of tiled "signature blocks" 1204. (Partial signature blocks may be present at the image edges.) Each signature block 1204 includes an 8×8 array of sub-blocks 1206. Each sub-block 1206 includes an 8×8 array of bit cells 1208. Each bit cell comprises a 2×2 array of "bumps" 1210. Each bump 1210, in turn, comprises a square grouping of 16 individual pixels 1212.

The individual pixels 1212 are the smallest quanta of image data. In this arrangement, however, pixel values are not, individually, the data carrying elements. Instead, this role is served by bit cells 1208 (i.e. 2×2 arrays of bumps 1210). In particular, the bumps comprising the bits cells are encoded to assume one of the two patterns shown in FIG. 3. As noted earlier, the pattern shown in FIG. 3A represents a "0" bit, while the pattern shown in FIG. 3B represents a "1" bit. Each bit cell 1208 (64 image pixels) thus represents a single bit of the embedded data. Each sub-block 1206 includes 64 bit cells, and thus conveys 64 bits of embedded data.

The nature of the image changes effected by the encoding follows the techniques set forth in U.S. Pat. No. 5,862,260 under the heading MORE ON PERCEPTUALLY ADAPTIVE SIGNING.

In the illustrated embodiment, the embedded data includes two parts: control bits and message bits. The 16 bit cells 1208A in the center of each sub-block 1206 serve to convey 16 control bits. The surrounding 48 bit cells 1208B serve to convey 48 message bits. This 64-bit chunk of data is encoded in each of the sub-blocks 1206, and is repeated 64 times in each signature block 1204.

A digression: in addition to encoding of the image to redundantly embed the 64 control/message bits therein, the values of individual pixels are additionally adjusted to effect encoding of subliminal graticules through the image. In this embodiment, the graticules discussed in conjunction with FIG. 29A in U.S. Pat. No. 5,862,260 are used, resulting in an imperceptible texturing of the image. When the image is to be decoded, the image is transformed into the spatial domain, a Fourier-Mellin technique is applied to match the graticule energy points with their expected positions, and the processed data is then inverse-transformed, providing a registered image ready for decoding (see U.S. Pat. No. 5,862,260). The sequence of first tweaking the image to effect encoding of the subliminal graticules, or first tweaking the image to effect encoding of the embedded data, is not believed to be critical. As presently practiced, the local gain factors (discussed in U.S. Pat. No. 5,862,260) are computed; then the data is encoded; then the subliminal graticule encoding is performed. Both of these encoding steps make use of the local gain factors.

Returning to the data format, once the encoded image has been thus registered, the locations of the control bits in sub-block 1206 are known. The image is then analyzed, in the aggregate (i.e. considering the "northwestern-most" sub-block 1206 from each signature block 1204), to determine the value of control bit #1 (represented in sub-block 1206 by bit cell 1208Aa). If this value is determined (e.g. by statistical techniques of the sort detailed above) to be a "1," this indicates that the format of the embedded data conforms to the standard detailed herein. According to this standard, control bit #2 (represented by bit cells 1208Ab) is a flag indicating whether the image is copyrighted. Control bit #3 (represented by bit cells 1208Ac) is a flag indicating whether the image is unsuitable for viewing by children. Certain of the remaining bits are used for error detection/correction purposes.

The 48 message bits of each sub block 1206 can be put to any use; they are not specified in this format. One possible use is to define a numeric "owner" field and a numeric "image/item" field (e.g. 24 bits each).

If this data format is used, each sub-block 1206 contains the entire control/message data, so same is repeated 64 times within each signature block of the image.

If control bit #1 is not a "1," then the format of the embedded data does not conform to the above described standard. In this case, the reading software analyzes the image data to determine the value of control bit #4. If this bit is set (i.e. equal to "1"), this signifies an embedded ASCII message. The reading software then examines control bits #5 and #6 to determine the length of the embedded ASCII message.

If control bits #5 and #6 both are "0," this indicates the ASCII message is 6 characters in length. In this case, the 48 bit cells 1208B surrounding the control bits 1208A are interpreted as six ASCII characters (8 bits each). Again, each sub-block 1206 contains the entire control/message data, so same is repeated 64 times within each signature block 1204 of the image.

If control bit #5 is "0" and control bit #6 is "1," this indicates the embedded ASCII message is 14 characters in length. In this case, the 48 bit cells 1208B surrounding the control bits 1208A are interpreted as the first six ASCII characters. The 64 bit cells 1208 of the immediately-adjoining sub-block 1220 are interpreted as the final eight ASCII characters.

Note that in this arrangement, the bit-cells 1208 in the center of sub-block 1220 are not interpreted as control bits. Instead, the entire sub-block serves to convey additional message bits. In this case there is just one group of control bits for two sub-blocks.

Also note than in this arrangement, pairs of sub-blocks 1206 contains the entire control/message data, so same is repeated 32 times within each signature block 1204 of the image.

Likewise if control bit #5 is "1" and control bit #6 is "0." This indicates the embedded ASCII message is 30 characters in length. In this case, 2×2 arrays of sub-blocks are used for each representation of the data. The 48 bit cells 1208B surrounding control bits 1208A are interpreted as the first six ASCII characters. The 64 bit cells of each of adjoining block 1220 are interpreted as representing the next 8 additional characters. The 64 bits cells of sub-block 1222 are interpreted as representing the next 8 characters. And the 64 bit cells of sub-block 1224 are interpreted as representing the final 8 characters. In this case, there is just one group of control bits for four sub-blocks. And the control/message data is repeated 16 times within each signature block 1204 of the image.

If control bits #5 and #6 are both "1's", this indicates an ASCII message of programmable length. In this case, the reading software examines the first 16 bit cells 1208B surrounding the control bits. Instead of interpreting these bit cells as message bits, they are interpreted as additional control bits (the opposite of the case described above, where bit cells normally used to represent control bits represented message bits instead). In particular, the reading software interprets these 16 bits as representing, in binary, the length of the ASCII message. An algorithm is then applied to this data (matching a similar algorithm used during the encoding process) to establish a corresponding tiling pattern (i.e. to specify which sub-blocks convey which bits of the ASCII message, and which convey control bits.)

In this programmable-length ASCII message case, control bits are desirably repeated several times within a single representation of the message so that, e.g., there is one set of control bits for approximately every 24 ASCII characters. To increase packing efficiency, the tiling algorithm can allocate (divide) a sub-block so that some of its bit-cells are used for a first representation of the message, and others are used for another representation of the message.

Reference was earlier made to beginning the decoding of the registered image by considering the "northwestern-most" sub-block 1206 in each signature block 1204. This bears elaboration.

Depending on the data format used, some of the sub-blocks 1206 in each signature block 1204 may not include control bits. Accordingly, the decoding software desirably determines the data format by first examining the "northwestern-most" sub-block 1206 in each signature block 1204; the 16 bits cells in the centers of these sub-blocks will reliably represent control bits. Based on the value(s) of one or more of these bits (e.g. the Digimarc Beta Data Format bit), the decoding software can identify all other locations throughout each signature block 1204 where the control bits are also encoded (e.g. at the center of each of the 64 sub-blocks 1206 comprising a signature block 1204), and can use the larger statistical base of data thereby provided to extract the remaining control bits from the image (and to confirm, if desired, the earlier control bit(s) determination). After all control bits have thereby been discerned, the decoding software determines (from the control bits) the mapping of message bits to bit cells throughout the image.

To reduce the likelihood of visual artifacts, the numbering of bit cells within sub-blocks is alternated in a checkerboard-like fashion. That is, the "northwestern-most" bit cell in the "northwestern-most" sub-block is numbered "0." Numbering increases left to right, and successively through the rows, up to bit cell 63. Each sub-block diametrically adjoining one of its corners (i.e. sub-block 1224) has the same ordering of bit cells. But sub-blocks adjoining its edges (i.e. sub-blocks 1220 and 1222) have the opposite numbering. That is, the "northwestern-most" bit cell in sub-blocks 1220 and 1222 is numbered "63." Numbering decreases left to right, and successively through the rows, down to 0. Likewise throughout each signature block 1204.

In a variant of this format, a pair of sub-blocks is used for each representation of the data, providing 128 bit cells. The center 16 bit cells 1208 in the first sub-block 1206 are used to represent control bits. The 48 remaining bit cells in that sub-block, together with all 64 bit cells 1208 in the adjoining sub-block 1220, are used to provide a 112-bit message field. Likewise for every pair of sub-blocks throughout each signature block 1204. In such an arrangement, each signature block 1204 thus includes 32 complete representations of the encoded data (as opposed to 64 representations in the earlier-described standard). This additional length allows encoding of longer data strings, such as a numeric IP address (e.g., URL).

Obviously, numerous alternative data formats can be designed. The particular format used can be indicated to the decoding software by values of one or more control bits in the encoded image.

From the foregoing examples, there are a variety of ways to implement variable message protocols. In one approach having a fixed and variable message protocol, the fixed protocol portion is mapped to a fixed part of the host signal, and does not vary in length. In another approach, the number of locations in the host signal used to represent the message control portion decrease as the length of the variable message increases. The control portion may remain fixed, as in the first case, even if the variable message varies in length, by varying the repetition/error correction coding applied to the variable message portion.

Use of Variable Repetition with Error Correction Coding

U.S. application Ser. No. 10/020,519 (published as US 2002-0159614) explained that the tail of a convolutionally coded message is more error prone than the rest of the message. One way to make the tail more robust to errors is apply a block error correction code, such as a BCH or other block error correction code, to the tail portion of the message. In this approach, the encoder applies block error correction coding to all, or just the tail of a message sequence, and then follows with convolutional coding of the resulting message sequence. The decoder then reverses this process, effectively using the block error correction to correct errors in the tail of the message.

U.S. application Ser. No. 10/139,147 (published as US 2003-0037075 A1) discusses the use of repetition and error correction coding. One way to compensate for the errors in the tail of a convolutionally coded message is to use repetition coding, where symbols of the convolutionally coded message are repeated, and specifically repeated in a variable fashion. The message symbols of the error correction coded message that are more prone to error, such as the tail symbols of the message in a convolutionally coded message, are repeated more than symbols at the beginning or middle of the message.

These approaches extend generally to error correction coding schemes with memory, where lack of memory at a part of the message makes that part more error prone. In particular, selective block coding or variable repetition coding of the error prone part improves the error robustness of the digital watermark message. Block error correction codes, unlike convolutional codes, do not have memory. Memory refers to the attribute of the coding method where subsequent symbols are used to correct errors in previous symbols. Variable repetition coding may be performed on individual error correction coded symbols, or blocks of such symbols. Preferably, more error prone symbols are repeated more than less error prone, error correction coded symbols.

Another way to address the error prone tail part of a convolutionally coded message is to use tail biting codes, where the tail of the coded message loops around to the head or start of the coded message. Such tail biting codes may suffer from being too computationally complex relative to the improvement in error robustness that they can provide.

Returning to the specific approach of using variable repetition, we have experimented with a number of variable repetition assignments for error correction coded symbols of digital watermark messages. A programmatic process generates the assignments from a curve that represents the repetition per symbol position over a sequence of message symbols in a digital watermark message from the start of the message to its end or "tail." Our experiments show that a variable repetition curve approximating a tan hyperbolic function, comprising constant repetition rate per symbol followed by an increasing repetition rate per symbol, and ending in a constant repetition rate, provides improved error robustness relative to the use of a constant repetition rate throughout the error correction encoded message.

Further experiments show that a variable repetition curve, starting with a constant repetition rate for the beginning of the message, and concluding with a linear increase in the repetition rate at the middle to end of the message also provides improved error robustness.

These curves may be approximated with a staircase shaped curve comprising segments of constant repetition rates at different levels of repletion. In some implementations, these stair case approximations are convenient because they facilitate the use of scrambling/encryption of the output of the repetition coder, and also facilitate decoding of a digital watermark message with fixed and variable protocol portions as described above.

The effect of this approach is to set a variable signal to noise for the error correction coded symbols through variable repetition rates of those symbols. Relative to constant repetition rate coding of error correction coded symbols, this approach achieves a lower effective error rate for the same signal to noise ratio of the digital watermark message signal.

Automated and/or programmatic methods may be used to find optimized variable repetition curves for a given digital watermark message model. Our experience shows that the errors introduced by the digital watermarking channel on the error correction coded message are approximated by white guassian noise. As such, our programmatic processes model the channel, and use general parameters defining characteristics of the curve, to compute the repetition rate per error correction coded symbol that achieves preferred error robustness.

The first step in formulating a repetition rate per symbol curve involves choosing an appropriate model. It is not a requirement to choose a parametric model, but it is a convenience. The principle basis for consideration of a model is that it is monotonically increasing. Further, it should allow flexibility in tuning the initial point of repetition increase as well as the rate of increase, which may or may not be constant. We, for example, have found that both the hyperbolic tangent and the piece-wise linear constant model behave satisfactorily.

Once a model is chosen it remains to vary its parameters until the best behavior in terms of minimum error rate is found. Specifically, if one can model the noise characteristics of the digital watermark message at the input to the convolutional decoder, it is desirable to run many simulations with pseudo-randomly generated noise in order to determine how the model and corresponding choice of parameters behave. If a slight perturbation in the model parameters produces a better simulation effect (e.g., lower error rate), we continue to adjust the parameters in the direction of the perturbation. One programmatic process for converging on an optimized result is a gradient-descent procedure. The model parameters are adjusted using such a procedure, according to perturbation and simulation re-evaluation, until a minimum in the error rate is achieved. In order to avoid problems with local minima on the optimization surface and/or simulation noise, one may wish to perform the search using several different initial parameter configurations. It should be noted that for all choices of models and corresponding parameters, the total number of repetitions should remain fixed. In other words, the area under the repetition curve is constant.

Extensions

The above concepts of protocols with variable robustness coding may be extended to optimize auxiliary data coding applications, including digital watermarking. Generally stated, the approach described in the previous section uses variable robustness coding to reduce the error rate in more error prone parts of a steganographic message. One specific form of variable robustness coding is variable repetition coding of more error prone parts of an error correction coded message.

One variation of this approach is to analyze a model of the channel and/or the host media signal that is communicated through that channel to determine locations within the steganographic code (e.g., embedding locations of a digital watermark) that are likely to be more error prone. In these locations, the steganographic encoding process uses a more robust message coding scheme than in other locations that are less error prone. One specific example is to subdivide the host media signal, such as an image, video frame or audio file into blocks, such as the contiguous tiles described above. Then, the embedder measures the expected error rate for each block, and applies an amount of error robustness coding to the steganographic code mapped to that block corresponding to the expected error rate. Higher error rate blocks have a greater amount of robustness coding, such as more repetition per message symbol. For example, for fixed sized tiles, the error robustness coding increases, resulting in fewer message symbols in the block, but at a higher error robustness level.

The measurement of expected error rate can be modeled based on a model of the channel and/or model of the host signal. For example, the host signal may have certain properties that make the steganographic code embedded in it more error prone for a particular channel. For example, an image that has less variance or energy in a block may be more error prone for a distortion channel that includes printing, scanning, and/or compression. As such, a measure of the variance in the block provides an indicator of the error rate, and thus, an indicator of the type of error robustness coding that need by applied to reduce the error rate. The error robustness, such as the extent of repetition coding or strength of the error correction code is selected to correspond to the desired error rate for the block.

One challenge in supporting such variable robustness coding within blocks of a host signal is the extent to which the auxiliary data decoder (e.g., digital watermark reader) is able to interpret variable robustness coding. This can be addressed by using a message protocol with fixed and variable protocol portions, where the fixed portion in each block specifies the type of error robustness coding used for that block. Alternatively, if the embedder uses a robust measure of achievable capacity for a given error rate, it is possible to determine the amount and/or type of robustness coding that was used at the encoder by observing the data at the auxiliary data decoder. In this way, the decoder can exploit what it knows about the channel, namely, the received host signal carrying the auxiliary data (e.g., an image carrying a digital watermark) and supposed processing noise, in the same fashion that it was exploited at the embedder of the auxiliary data. In particular, if the measure of the expected error rate is likely to be the same at the embedder and the decoder, even after distortion by the channel and the embedding of the auxiliary data, then the decoder can simply re-compute the expected error rate at the receiver, and use this measure to determine the type of error robustness coding that has been applied. In another words, a part of the auxiliary data need not be allocated to identifying the type of error robustness coding if the decoder can derive it from the received signal, the channel, and/or other information available to it.

Encryption for Multi-Watermark Schemes

We disclose in assignee's U.S. patent application Ser. No. 10/686,495, filed Oct. 14, 2003 (published as US 2004-0181671 A1), herein incorporated by reference, watermarking methods, systems and associated identification documents, that include plural watermarks cooperating to provide authentication. For example, an identification document may include first and second digital watermarks embedded therein. Each of the watermarks preferably includes plural-bit payloads. The payloads include corresponding information, e.g., redundant or related information. In one implementation the first watermark payload includes a document number and the second watermark payload includes a checksum to verify the number. In other implementations the first or second payload includes information that is redundant with the first or second payload (e.g., a birth date is carried by both watermark payloads).

Detection and comparison of the first and second watermark payloads facilitates authentication of the identification documents or other physical objects.

Application Ser. No. 10/686,495 also envisions encrypting one or more of the payloads.

We have recently determined that we can encrypt one watermark payload and still help authenticate or safeguard both watermark payloads.

In a first implementation, a first digital watermark payload includes a first set of information. A first checksum (e.g., Cyclic Redundancy Check (CRC)) is provided that corresponds with the first set of information. A second digital watermark payload includes a second set of information. A second checksum is provided that corresponds with the second set of information. The first checksum and the second checksum are appended to or otherwise combined with the first set of information. The combined checksums and first set of information are encrypted using conventional encryption techniques (e.g., RSA, triple-DES, MD2, MD5, MD11, SHA, SHA1 or a Federal Information Processing Standard (FIPS) encryption method) as represented below.

Encrypt [($1^{st}$ Checksum|$2^{nd}$ Checksum)|$1^{st}$ Set of Information], where the symbol "|" represents combining or appending.

The encrypted combined checksums and first set of information is embedded via a first digital watermark and the second set of information is embedded via a second digital watermark.

To authenticate the first and second digital watermarks, or to provide a confidence measure regarding the integrity of the first and second watermarks, a watermark detector decodes the watermarks to obtain the encrypted first set of information and checksums and the second set of information. The encrypted first set of information and checksums are decrypted with a corresponding decryption key to obtain the first set of information and checksums. The integrity of the first set of information is determined through a match or acceptable correspondence with the first checksum. (More accurately, a statistical probability is determined for the checksum correspondence, but fretting over the "probability" become increasing irrelevant as the security of the checksum increases.) The second checksum is used to verify the integrity of the second set of information. Thus, encrypting the first watermark payload including checksums leads to authentication of the first and second digital watermarks.

(Considered further, it would be almost statically improbable to change the second digital watermark payload, or swap it for a different watermark, and have the changed or swapped watermark still match the second checksum carried by the encrypted first watermark payload.).

Instead of including a second checksum, we can alternatively use redundant information carried by the first set of information to verify the authenticity of the second set of information. Suppose, for example, that both the first and second sets of information carry a birth date and a document bearer's last name. The first set of information is encrypted, perhaps along with a checksum corresponding to the first set of information. To authenticate, the encrypted first set of information is decrypted (and perhaps verified with the checksum). The redundant information (birth date and last name) from the first set of information is then compared with the same redundant information in the second set of information. If the comparison yields a match (or acceptable correspondence) the watermarks are considered secure.

In a second implementation, we carry a checksum in a second digital watermark. The checksum is preferably provided across a second set of information and at least a portion of a first set of information. The first set of information is encrypted and then carried by a first digital watermark. The checksum is appended or otherwise combined with the second set of information and the combined checksums and second set of information are carried by a second digital watermark. To gain confidence in the watermarks, the first and second watermark are decoded to obtain the encrypted first set of information (from the $1^{st}$ watermark) and the combined checksum and second set of information (from the $2^{nd}$ watermark). The encrypted first set of information is decrypted, and the checksum from the second watermark is matched (or determined if it falls within acceptable tolerances) across the portion of or the entire first set of information and the second set of information. High confidence in the watermarks is found when the checksum coincides within expected tolerances. Again, encryption of only one of the watermarks (here the first set of information) leads to authentication or verification of both the first and second digital watermarks.

In a third and related implementation, the second digital watermark includes two checksums, a first checksum for a first set of information (encrypted and carried by a first digital watermark) and a second checksum for a second set of information (unencrypted and carried by a second digital watermark). The first and second checksums are appended to or otherwise combined with the second set of information, and the combined data is carried by the second digital watermark. Authentication occurs when the checksum corresponds to their respective sets of information in an acceptable manner.

(Another implementation appends a checksum to an encrypted first set of information. The appended checksum and the encrypted first set of information are conveyed via a first digital watermark. The checksum corresponds to the first set of information and a second set of information, which is carried by a second digital watermark.).

The above implementations work well, especially when one of the two payloads (i.e., the unencrypted payload) is constrained in bit-size (e.g., <64 bits). A constrained bit-size payload may be too small to favorably encrypt. In this case, the other (and encrypted) payload is preferably larger (e.g., >96 bits) to favorably receive encryption. Of course, encryption can take place in a watermark embedder or an application or process cooperating or communicating with a watermark embedder.

The first and second set of information may also include or be appended with content dependent bits. For example, if the first set of information is to be embedded in a photographic representation of a bearer of a document, a hash or signature of the photographic representation can be included or appended to the first set of information. A checksum is provided over information including the hash or signature. We note, however, that we preferably do not encrypt the hash or signature.

Additional security is provided through a so-called human visual system model (HVS) to tie a watermark to imagery through the used of local-gain and local embedding adjustment.

(As a tangential discussion we note that access control via encryption is accomplished by encrypting so-called private bits using a public key for a particular issuing jurisdiction. We prefer to encrypt before encrypting a primary payload with a regional standard private key. We can add additional random bits to help keep a payload private. A separate checksum is not needed since a corresponding decryption key is known and these private bits are encrypted with a regional private key with its own checksum bits. A private key only stored in secure jurisdiction detectors to view private payload.)

Figure 7:
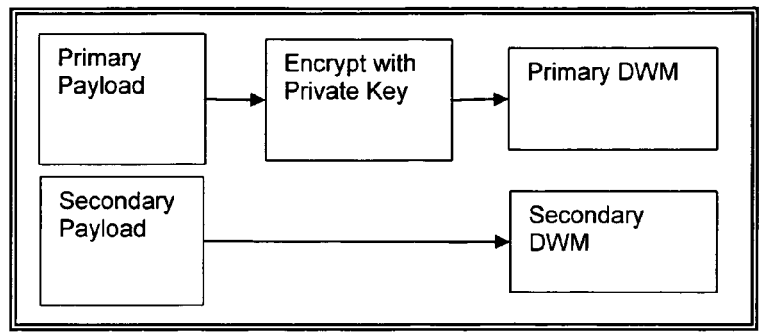
FIG. 7 shows a two payload scheme in which only one watermark payload is encrypted.
Figure 8:
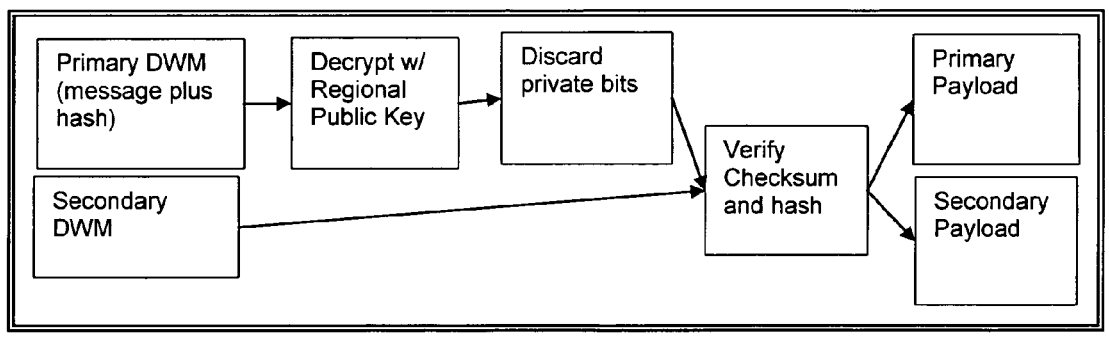
FIG. 8 illustrates a two payload scheme in which a primary payload is decrypted with a so-called "regional" public key.
Figure 9:
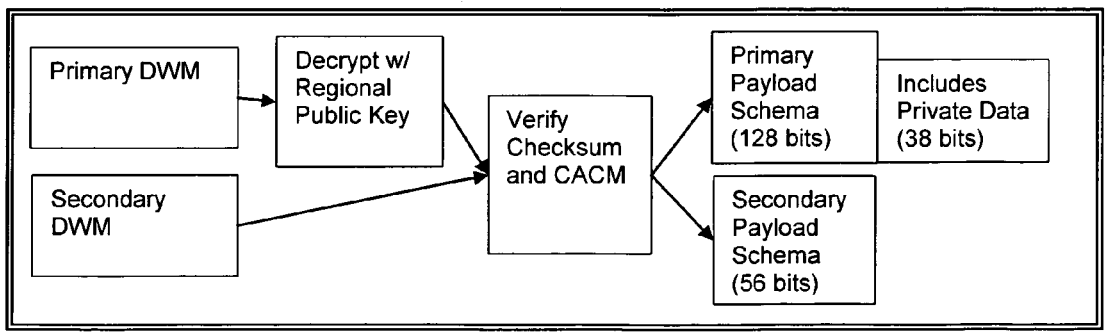
FIG. 9 illustrates a secure jurisdictional private detector.

A few block diagrams of possible encryption schemes are provided in FIGS. 7-9.

FIG. 7 shows a two payload scheme in which only one watermark payload is encrypted.

FIG. 8 illustrates a two payload scheme in which a primary payload is decrypted with a so-called "regional" public key. The regional public decryption key is provided to affiliated members within a region. The primary payload is presumed to include "private bits," or bits associated with an individual or issuing authority, or bits randomly inserted to ensure privacy. These bits are discarded prior to payload recovery.

FIG. 9 illustrates a secure jurisdictional private detector. Since this method assumes operation in a private system, the private data is not discarded as above, but is maintained with the primary payload.

Watermark Cryptology Alternatives

Watermarks are sometimes read and embedded based upon secrets, such as a pseudo-random (PN) sequence used to embed a watermark or features used within the watermark. These secrets may require testing to change. They are also the same for the embedder and detector; thus, once you disclose them, the user knows how to embed and read the watermark. It was stated in an Oct. 22, 1999, call for proposals from the European Broadcasting Union (EBU) that it is desirable to keep who knows how to read the watermark from embedding the watermark, but a favorable solution remains elusive until now.

One inventive solution uses encryption of a watermark message. The encryption can include encrypting only a plural-bit payload or a payload and authenticating data, such as CRC bits. The encryption can use symmetric key or public/private key encryption. When the public/private key encryption is used with both the payload and authenticating bits, the system can allows users to read the watermark, but not embed the watermark, and the reading process can be guaranteed that the correct key was used. Thus, this key can include additional information, such as the origination of the watermark without wasting valuable payload bits. If authentication bits are not used, the decryption will produce meaningless bits, but the user will not know they are meaningless. In addition, in certain situations, this can produce security flaws.

Figure 5:
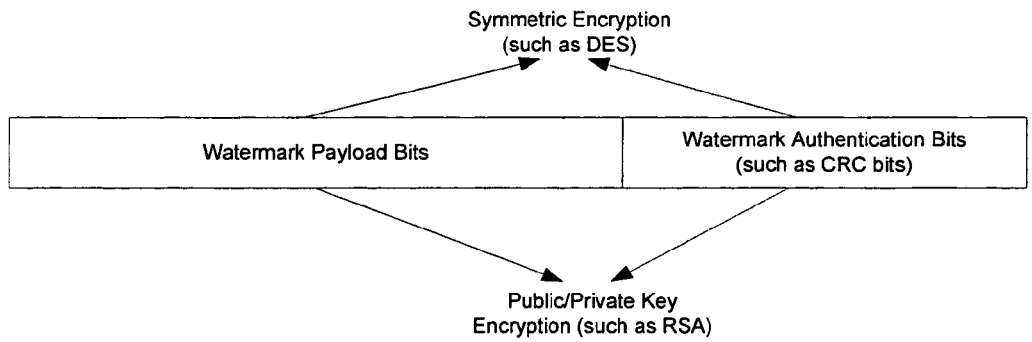
FIG. 5 is an overview of two different payload portions and related encryption.

As shown in FIG. 5 we present two partitions for a watermark payload and two types of encryption. A watermark payload preferably includes a message portion and authentication bits. The message portion includes plural binary bits of information. The authentication bits provide a mechanism to validate that the payload portion is read correctly by a watermark detector, and is calculated based on the message portion. A well-known approach is a CRC. The watermark message can also be redundantly embedded to reduce the chance of errors, such as embedding it over and over again, or using error correction encoding, e.g., convolutional coding. Convolutional coding typically includes error recovery.

A preferred system (FIG. 6) encrypts a watermark message, which includes message bits and a CRC, with a unique key per issuing jurisdiction. The system preferably uses public/private key pairs for at least three reasons. First, watermark readers are usually in a less secure environment than watermark embedders. Second, in a semi-open system, a reader for one jurisdiction reads ID documents from other jurisdictions as well, but the reader preferably should not allow one jurisdiction to embed (or discover) an embedding ID for other jurisdictions. Third, the computational intensity of public/private key encryption will not typically matter since only a relatively small number of bits are encrypted.

Figure 6:
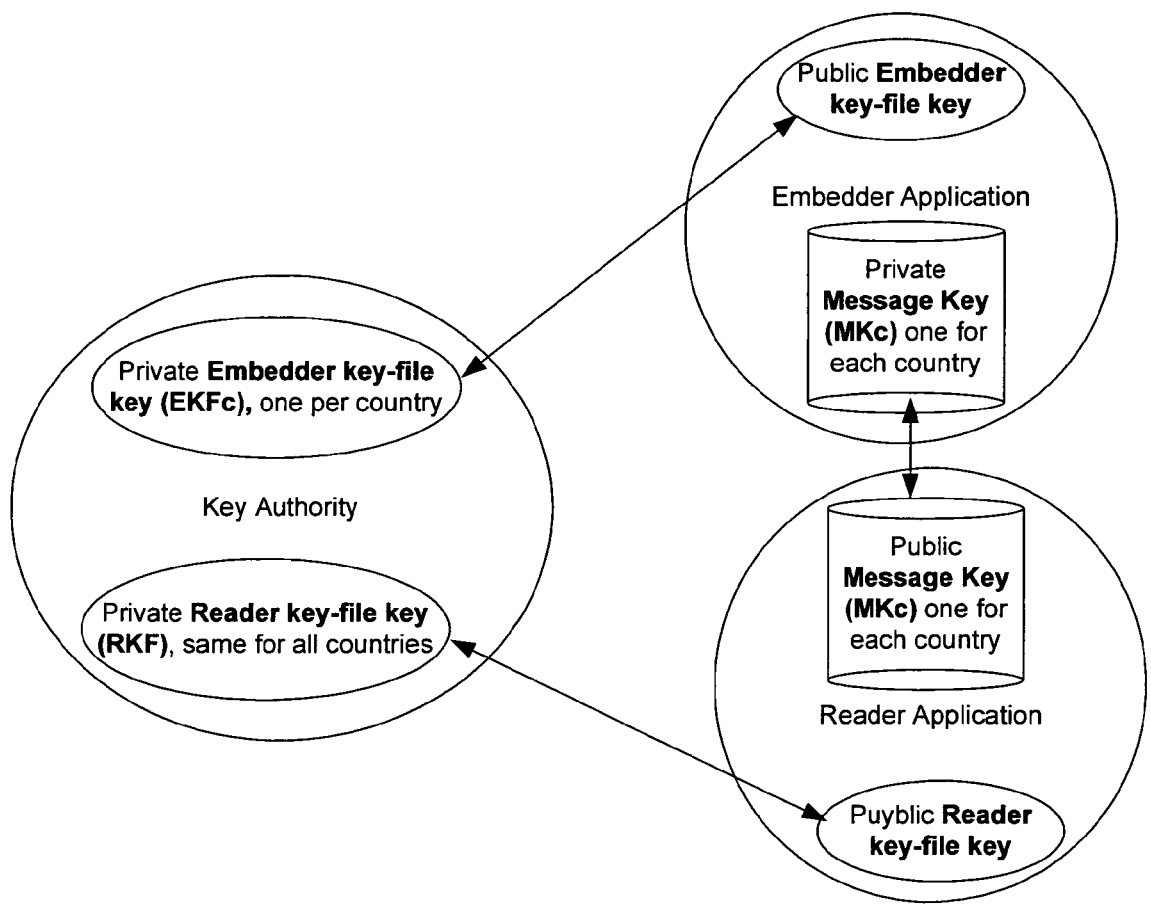
FIG. 6 shows a relationship between key pairs and related key management.

Message keys are preferably stored in encrypted format. Thus, a complete key usage model includes three (3) public/private key pairs, including (1) a message key pair (MKc), (2) an embedder key-file key pair (EKFc), and (3) a reader key-file key pair (RKF), as shown in FIG. 6.

All keys preferably use RSA or other conventional encryption.

The message key pair is used to encrypt a watermark message (e.g., payload and CRC bits), and is preferably unique for each issuing jurisdiction, since it is preferred that one jurisdiction can read embedded messages of another jurisdiction, but not be able to embed (or encrypt) the messages for that jurisdiction. The embedder key-file key pair is used to encrypt private message keys for the embedder. This key pair is unique to each jurisdiction, thus making it more difficult to embed as another jurisdiction even if you find all the locations where the keys are stored (e.g., obfuscated) in the embedder code. The reader key-file key pair is used to encrypt a public message key, and is the same for every jurisdiction since all the jurisdictions preferably have the same reader.

Note, that the reader key-file key pair could be different for each jurisdiction and the message key could use a symmetric encryption scheme, but the above model provides additional security with minimal increase in computation since the message will typically include less than 128 bits.

In addition, given the preference that jurisdictions are able to read all other jurisdictions embedding, a reader preferably includes public message keys for all of the jurisdictions whereas the embedder will contain only the private keys for that jurisdiction. More specifically, the reader will preferably include the public message keys for the lifetime of the document (e.g., 10 years for a passport). The embedder will contain two private message keys for each jurisdiction, one for this two year interval, and one for the next two year interval so key distribution happens flawlessly.

Public Key Watermarking

Public key watermarking is applicable to systems that know a watermark should exist, thus removal is not an attack. It is also beneficial to systems where removal is an attack, since improper watermarks cannot be created after analyzing the detector. For example, copy once cannot be embedded in a copy never system, nor can a person embed a watermark without purchasing a legitimate embedder.

As background, public key encryption preferably meets the following criteria:

Kec op x=y; where Kec=encryption key, op=operation, x=plaintext, and y=ciphertext;

Kdc op y=x; where Kdc=decryption key, iln other words, Kdc op (Kec op x)=x;

Kdc op (Kdc op x) !=x; where !=is not equals;

Kec cannot be determined from Kdc; and

Kec never appears in the decrypting device.

A Public key watermarking scheme preferably meets the following criteria:

Kew op2 p=w; where Kew=embedder key, op2=operation, p=payload, and w=watermark (labeled ciphermark to differentiate it from a standard watermark);

Kdw op2 w=p; where Kdw=detector key, in other words, Kdw op2 (Kew op2 p)=p;

Kdw op (Kdw op p) !=p, where !=is not equals;

Kew cannot be determined from Kdw; and

Kew never appears in the detector.

The apparent difficulty is that op is special for public key encryption, whereas op2 is correlation based for most watermarking methods. Interestingly, op2 can be, e.g., a 1024-bit spread spectrum chip, and most the public key encryption keys are 1024-bits Some watermarking techniques use a so-called orientation component. An orientation component is helpful in resolving distortion such as rotation, scale and translation.

One type of watermark orientation component is an image signal that comprises a set of impulse functions in a transform domain, like a Fourier magnitude domain, e.g., each with pseudorandom phase. To detect rotation and scale of a watermarked image (e.g., after printing and scanning of the watermarked image), a watermark decoder converts the watermarked image to the Fourier magnitude domain and then performs, e.g., a log polar resampling of the Fourier magnitude image. A generalized matched filter correlates a known orientation component with the re-sampled watermarked signal to find the rotation and scale parameters providing the highest correlation. The watermark decoder performs additional correlation operations between the phase information of the known orientation signal and watermarked signal to determine translation parameters, which identify an origin of the watermark signal. Having determined the rotation, scale and translation of the watermark signal, the watermark reader then adjusts the image data to compensate for this distortion, and extracts the watermark message signal.

If, after using correlation to find orientation, a watermark detection process does not then use correlation to detect a watermark payload (p) from the watermark (w), Kew is not needed in the detector and op2 can be equal to op.

More specifically, a watermark is created using, e.g., a 1024-bit embedding key. An expanded payload is provided (where the payload (p) such as 96 bits) and expanded with repetition, error correction and checksum to 1024 bits, and then a standard public key encryption algorithm (RSA) results in 1024-bits of ciphermark (w). This 1024-bit ciphermark is then embedded using standard image steganographic embedding techniques (e.g., as described in U.S. Pat. Nos. 6,122,403 and 6,614,914). Using the embedder key and public key encryption algorithm replaces using, e.g., an XOR with a spread spectrum sequence since encryption randomizes the data.

The ciphermark is detected by first detecting a watermark orientation component, then determining a corresponding orientation, scale and rotation (i.e. synchronization). The ciphermark is then read by comparing a pixel to its neighbors as is found in the steganographic literature. The ciphermark is turned into a payload by using the standard public key encryption algorithm (e.g., RSA or other conventional encryption) as used in the embedder to result in, e.g., 1024-bits of expanded payload, reversing error correction if any, and using a checksum for accuracy The watermark can be embedded as overlaid 32×32 pixel (1024 pixel) sub-blocks to create a 128×128 block.

In this method, Kew never appears in the detector, nor can be calculated from Kdw. In other words, the embedding spreading function is not needed in the detector.

In addition, if the expanded payload includes content dependent bits (as described in, e.g., assignee's U.S. patent application Ser. No. 10/158,385 (published as US 2003-0223584 A1) and Ser. No. 10/449,827 (published as US 2004-0039914 A1), which are each herein incorporated by reference), these bits are preferably encrypted. Thus, if the ciphermark (w) is copied to another image with a copy attack, the content dependent bits will not match the new image. In addition, the content dependent bits cannot be modified even if the fingerprint algorithm for calculating the content dependent bits is known, and calculated for the new image, since Kew is not known, nor can be calculated from Kdw, to replace the original with the new content dependent bits.

In addition to the combinations outlined in the claims, a few possible combinations of the above disclosure include:

A. An encoding method for digital watermarking comprising:

receiving an n-bit payload, wherein n comprises an integer;

expanding the n-bit payload to m-bits, wherein m comprises an integer and matches a bit-length of an embedding key, and wherein m>n, said expanding resulting at least in part from at least one of error correction coding and bit redundancy;

randomizing the m-bits through encrypting the m-bits; and embedding the encrypted m-bits in media.

A1. The method of A wherein said randomizing yields an m-bit string.

A2. The method of A wherein said expanding comprises appending a checksum.

A3. The method of A wherein said expanding comprises appending content dependent bits to the payload.

B. An encoding method for a digital watermark component, said method comprising:

receiving an n-bit payload, wherein n comprises an integer;

expanding the n bits to m bits, wherein m comprises an integer and wherein m>n, wherein said expanding comprises error correction coding and checksum bits;

encrypting the m-bits with an encryption key;

embedding the m-bits in media.

B1. The method of B wherein said expanding comprises appending content dependent bits to the payload.

B2. The method of B 1, wherein said content dependent bits comprise a hash or digital signature.

B3. The method of any one of B-B2, wherein said method approximates spread spectrum modulation.

C. A method of managing encryption keys for digital watermarking comprising:
- providing a plurality of watermark message key pairs, wherein each of the watermark message key pairs is unique per embedding authority, and wherein each message key pair comprises a public and private key which allows only the embedding authority to encrypt messages via the private key while allowing decryption of such encryption messages only via the corresponding public key;
- providing a plurality of embedder key pairs, wherein each of the watermark embedder key pairs is unique per embedding authority, and wherein each embedder key pair comprises a public and private key which allows only the embedding authority to encrypt private message keys for a corresponding watermark embedder via the private key while allowing decryption only via the corresponding public key; and
- providing a plurality of reader key pairs, wherein each of the reader key pairs is common among each of the embedding authorities so that each jurisdiction can read messages embedded thereby.

CONCLUDING REMARKS

Having described and illustrated the principles of the technology with reference to specific implementations, it will be recognized that the technology can be implemented in many other, different, forms. The variable message coding protocols may be used in digital watermarking applications where digital watermarks are embedded by imperceptibly modifying a host media signal. They may also be used in steganographic applications where message are hidden in media signals, such as images (including graphical symbols, background textures, halftone images, etc.) or text. The embedding or encoding of the message according to the variable protocols may, in some cases create visible structures or artifacts in which the message is not discernable by a human, yet is readable by an automated reader with knowledge of the protocol, including any keys used to scramble the message.

To provide a comprehensive disclosure without unduly lengthening the specification, applicants incorporate by reference the U.S. patent documents referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method, comprising:
providing a checksum over at least a portion of a second digital watermark payload;
combining the checksum with a first digital watermark payload;
encrypting the combined checksum and first digital watermark payload;
embedding, using a hardware processor, a first digital watermark in media, wherein the first digital watermark comprises the encrypted combined checksum and first digital watermark payload; and
embedding a second digital watermark in the media, wherein the second digital watermark comprises the second digital watermark payload, and wherein the first digital watermark payload and the second digital watermark payload are secured through encryption of only the combined checksum and first digital watermark payload.

2. The method of claim 1, further comprising:
providing the media on a physical object.

3. The method of claim 2, wherein the providing the media on the physical object comprises printing or engraving.

4. The method of claim 2, wherein the media comprises a first portion and a second portion, wherein the first digital watermark is embedded in the first portion, and wherein the second digital watermark is embedded in the second portion.

5. The method of claim 4, wherein the first portion comprises a photographic representation of a human subject.

6. The method of claim 4, wherein the second portion comprises at least one of a background, graphic, photograph or artwork.

7. The method of claim 2, wherein the physical object comprises an identification document.

8. A method comprising:
providing a checksum over at least a portion of a first digital watermark payload and a second digital watermark payload;
combining the checksum with the second digital watermark payload;
encrypting the first digital watermark payload;
embedding, using a hardware processor, a first digital watermark in media, wherein the first digital watermark comprises the encrypted first digital watermark payload; and
embedding a second digital watermark in the media, wherein the second digital watermark comprises the combined checksum and second digital watermark payload, wherein the first digital watermark payload and the second digital watermark payload are secured through encryption of only the first digital watermark payload and the combining of the checksum with the second digital watermark payload.

9. The method of claim 8, further comprising:
providing the media on a physical object.

10. The method of claim 9, wherein the providing the media on the physical object comprises printing or engraving.

11. The method of claim 8, wherein the media comprises a first portion and a second portion, wherein the first digital watermark is embedded in the first portion, and wherein the second digital watermark is embedded in the second portion.

12. A method comprising:
providing a first checksum over a first digital watermark payload;
providing a second checksum over a second digital watermark payload;

combining the first checksum, the second checksum and the first digital watermark payload;
encrypting the combined first checksum, second checksum and first digital watermark payload;
embedding, using a hardware processor, a first digital watermark in media, wherein the first digital watermark comprises the encrypted combined first checksum, second checksum and first digital watermark payload; and
embedding a second digital watermark in the media, wherein the second digital watermark comprises the second digital watermark payload, and wherein the first digital watermark payload and the second digital watermark payload are secured through encryption of the combined first checksum, second checksum and first digital watermark payload.

13. A method comprising:
providing information redundantly in a first digital watermark payload and a second digital watermark payload, wherein the first digital watermark payload and the second digital watermark payload includes at least some information that is unique relative to each other;
providing a checksum over at least a portion of the second digital watermark payload;
combining the checksum with the first digital watermark payload;
encrypting the combined checksum and first digital watermark payload;
embedding, using a hardware processor, a first digital watermark in data representing audio, imagery or video content to be rendered to a user, wherein the first digital watermark comprises the encrypted combined checksum and first digital watermark payload; and
embedding a second digital watermark in the data, wherein the second digital watermark comprises the second digital watermark payload, wherein the first digital watermark payload and the second digital watermark payload are secured through encryption of only the combined checksum and first digital watermark payload, and wherein both embedding acts change not just the data representing the content, but also change the content itself.

14. A method comprising:
decrypting media;
extracting a first digital watermark from the media, wherein the first digital watermark comprises an encrypted combined checksum and first digital watermark payload, wherein the checksum is calculated over at least a portion of a second digital watermark payload;
extracting a second digital watermark from the media, wherein the second digital watermark comprises the second digital watermark payload, wherein the first digital watermark payload and the second digital watermark payload are secured through encryption of only the combined checksum and first digital watermark payload, wherein the first digital watermark payload and the second digital watermark payload comprise redundant information, and wherein the first digital watermark payload and the second digital watermark payload includes at least some information that is unique relative to each other;
decrypting, using a hardware processor, the encrypted combined checksum and first digital watermark payload; and
determining whether the redundant information coincides as expected.

15. A non-transitory computer readable media having instructions stored therein, the instructions comprising:
instruction to provide information redundantly in a first digital watermark payload and a second digital watermark payload, wherein the first digital watermark payload and the second digital watermark payload includes at least some information that is unique relative to each other;
instruction to provide a checksum over at least a portion of the second digital watermark payload;
instruction to combine the checksum with the first digital watermark payload;
instruction to encrypt the combined checksum and first digital watermark payload;
instruction to embed a first digital watermark in data representing audio, imagery or video content to be rendered to a user, wherein the first digital watermark comprises the encrypted combined checksum and first digital watermark payload; and
instruction to embed a second digital watermark in the data, wherein the second digital watermark comprises the second digital watermark payload, wherein the first digital watermark payload and the second digital watermark payload are secured through encryption of only the combined checksum and first digital watermark payload, and wherein both embedding acts change not just the data representing the content, but also change the content itself.

16. An apparatus comprising:
a memory configured to store data, wherein the data represents audio, imagery or video content to be rendered to a user;
a hardware processor configured to:
provide information redundantly in a first digital watermark payload and a second digital watermark payload, wherein the first digital watermark payload and the second digital watermark payload includes at least some information that is unique relative to the each other;
provide a checksum over at least a portion of the second digital watermark payload;
combine the checksum with the first digital watermark payload;
encrypt the combined checksum and first digital watermark payload;
embed a first digital watermark in the data, wherein the first digital watermark comprises the encrypted combined checksum and first digital watermark payload; and
embed a second digital watermark in the data, wherein the second digital watermark comprises the second digital watermark payload, wherein the first digital watermark payload and the second digital watermark payload are secured through encryption of only the combined checksum and first digital watermark payload, and wherein both embedding features change not just the data representing the content, but also change the content itself.

17. The apparatus of claim 16, wherein the hardware processor is in a state of execution performing at least one function recited therein.

18. An apparatus comprising:
a hardware processor configured to:
provide a checksum over at least a portion of a second digital watermark payload;
combine the checksum with a first digital watermark payload;
encrypt the combined checksum and first digital watermark payload;

embed a first digital watermark in media, wherein the first digital watermark comprises the encrypted combined checksum and first digital watermark payload; and embed a second digital watermark in the media, wherein the second digital watermark comprises the second digital watermark payload, and wherein the first digital watermark payload and the second digital watermark payload are secured through encryption of only the combined checksum and first digital watermark payload.

19. A non-transitory computer readable media having instructions stored therein, the instructions comprising:

instructions to provide a checksum over at least a portion of a second digital watermark payload;

instructions to combine the checksum with a first digital watermark payload;

instructions to encrypt the combined checksum and first digital watermark payload;

instructions to embed a first digital watermark in media, wherein the first digital watermark comprises the encrypted combined checksum and first digital watermark payload; and instructions to embed a second digital watermark in the media, wherein the second digital watermark comprises the second digital watermark payload, and wherein the first digital watermark payload and the second digital watermark payload are secured through encryption of only the combined checksum and first digital watermark payload.

20. The apparatus of claim 18, wherein the hardware processor is further configured to provide the media on a physical object.

21. The non-transitory computer readable media of claim 19 further comprising:

instructions to provide the media on a physical object.

22. An apparatus comprising:

a hardware processor configured to:

provide a checksum over at least a portion of a first digital watermark payload and a second digital watermark payload;

combine the checksum with the second digital watermark payload;

encrypt the first digital watermark payload;

embed a first digital watermark in media, wherein the first digital watermark comprises the encrypted first digital watermark payload; and embed a second digital watermark in the media, wherein the second digital watermark comprises the combined checksum and second digital watermark payload, wherein the first digital watermark payload and the second digital watermark payload are secured through encryption of only the first digital watermark payload and the combining of the checksum with the second digital watermark payload.

23. A non-transitory computer readable media having instructions stored therein, the instructions comprising:

instructions to provide a checksum over at least a portion of a first digital watermark payload and a second digital watermark payload;

instructions to combine the checksum with the second digital watermark payload;

instructions to encrypt the first digital watermark payload;

instructions to embed a first digital watermark in media, wherein the first digital watermark comprises the encrypted first digital watermark payload; and instructions to embed a second digital watermark in the media, wherein the second digital watermark comprises the combined checksum and second digital watermark payload, wherein the first digital watermark payload and the second digital watermark payload are secured through encryption of only the first digital watermark payload and the combining of the checksum with the second digital watermark payload.

24. The apparatus of claim 22, wherein the hardware processor is further configured to provide the media on a physical object.

25. The non-transitory computer readable media of claim 23, further comprising:

instructions to provide the media on a physical object.

26. An apparatus comprising:

a hardware processor configured to:

provide a first checksum over a first digital watermark payload; provide a second checksum over a second digital watermark payload;

combine the first checksum, the second checksum and the first digital watermark payload;

encrypt the combined first checksum, second checksum and first digital watermark payload;

embed a first digital watermark in media, wherein the first digital watermark comprises the encrypted combined first checksum, second checksum and first digital watermark payload; and embed a second digital watermark in the media, wherein the second digital watermark comprises the second digital watermark payload, and wherein the first digital watermark payload and the second digital watermark payload are secured through encryption of the combined first checksum, second checksum and first digital watermark payload.

27. A non-transitory computer readable media having instructions stored therein, the instructions comprising:

instructions to provide a first checksum over a first digital watermark payload;

instructions to provide a second checksum over a second digital watermark payload;

instructions to combine the first checksum, the second checksum and the first digital watermark payload;

instructions to encrypt the combined first checksum, second checksum and first digital watermark payload;

instructions to embed a first digital watermark in media, wherein the first digital watermark comprises the encrypted combined first checksum, second checksum and first digital watermark payload; and instructions to embed a second digital watermark in the media, wherein the second digital watermark comprises the second digital watermark payload, and wherein the first digital watermark payload and the second digital watermark payload are secured through encryption of the combined first checksum, second checksum and first digital watermark payload.

28. An apparatus comprising:

a hardware processor configured to:

decrypt media;

extract a first digital watermark from the media, wherein the first digital watermark comprises an encrypted combined checksum and first digital watermark payload, wherein the checksum is calculated over at least a portion of a second digital watermark payload;

extract a second digital watermark from the media, wherein the second digital watermark comprises the second digital watermark payload, wherein the first digital watermark payload and the second digital watermark payload are secured through encryption of only the combined checksum and first digital watermark payload, wherein the first digital watermark payload and the second digital watermark payload comprise redundant information, and wherein the first digital watermark payload and the second digital watermark payload includes at least some information that is unique relative to each other;

decrypt the encrypted combined checksum and first digital watermark payload; and determine whether the redundant information coincides as expected.

29. A non-transitory computer readable media having instructions stored therein, the instructions comprising:

instructions to decrypt media;

instructions to extract a first digital watermark from the media, wherein the first digital watermark comprises an encrypted combined checksum and first digital watermark payload, wherein the checksum is calculated over at least a portion of a second digital watermark payload;

instructions to extract a second digital watermark from the media, wherein the second digital watermark comprises the second digital watermark payload, wherein the first digital watermark payload and the second digital watermark payload are secured through encryption of only the combined checksum and first digital watermark payload, wherein the first digital watermark payload and the second digital watermark payload comprise redundant information, and wherein the first digital watermark payload and the second digital watermark payload includes at least some information that is unique relative to each other;

instructions to decrypt the encrypted combined checksum and first digital watermark payload; and instructions to determine whether the redundant information coincides as expected.

\* \* \* \* \*

UNITED STATES PATENT AND TRADEMARK OFFICE
CERTIFICATE OF CORRECTION

| | | |
|---|---|---|
| PATENT NO. | : 8,127,137 B2 | |
| APPLICATION NO. | : 11/082217 | |
| DATED | : February 28, 2012 | |
| INVENTOR(S) | : Levy | |

It is certified that error appears in the above-identified patent and that said Letters Patent is hereby corrected as shown below:

Title Page 2, item (56), under "Other Publications", in Column 2, Line 2, delete "No. 60/544,543," and insert -- No. 60/554,543, --.

Title Page 3, item (56), under "Other Publications", in Column 1, Line 23, delete "Lees, U.K.," and insert -- Leeds, U.K., --.

Signed and Sealed this
Fourth Day of September, 2012

David J. Kappos
*Director of the United States Patent and Trademark Office*